Patented Mar. 25, 1930

1,751,550

UNITED STATES PATENT OFFICE

REED W. HYDE, OF SUMMIT, NEW JERSEY

PROCESS OF PREPARING ALUMINO-THERMIC MIXTURE

No Drawing.   Application filed September 29, 1928. Serial No. 309,359.

This invention relates to a method of treating metal bearing material to adapt the same to exothermic reduction when incorporated with other highly reducing metals and to a mixture of such materials which is capable of reacting with extreme rapidity and with the production of intense heat.

The invention may be applied specifically to a process for treating materials containing iron to render them suitable for reacting with aluminum in accordance with the alumino-thermic process, whereby comparatively large quantities of super-heated molten metal are produced which may be utilized for welding purposes.

The invention provides for forming a metal oxide in an open cellular condition which may be mixed with a finely divided reducing metal and which when ignited, is rapidly reduced thereby to the metallic condition with the evolution of intense heat. The material is particularly adapted to permit the reaction to rapidly travel throughout the entire mixture, whereby the time during which heat is produced is reduced to a minimum. Heat losses by radiation are thereby reduced and the heat conserved within the material itself. This heat is sufficient to melt the reduced metal and under certain conditions to melt additional quantities of metal which may be added thereto.

The invention also provides for the treatment of iron ores and iron by-products, in a cheap and efficient manner, for rendering them suitable for reduction in the above mentioned process.

This is accomplished by forming the iron bearing material in a thin layer and subjecting the same to a blast roasting or sintering operation preferably under conditions which produce a comparatively fragile sinter cake. The sintering operation eliminates various impurities and raises the oxygen content of the material to the desired point. The sinter is then crushed and mixed with additional quantities of metallic iron and finely divided aluminum in an amount chemically equivalent to the oxygen content in the iron. The crushed sinter is of cellular formation and by reason of its large surface area permits the reducing action to be rapidly propagated therethrough. The irregular structure of the sinter also serves to retain the aluminum particles and reduces their tendency to segregate.

Although the novel features which are believed to be characteristic of this invention will be particularly pointed out in the claims appended hereto, the invention itself, as to its objects and advantages, the mode of its operation and the manner of its organization may be better understood by referring to the following description in which a particular commercial embodiment thereof is disclosed. It will be understood, however, that the processes and the steps thereof may be modified in various respects without departing from the broad spirit and scope of the invention.

In the following description and in the claims the various steps in the process and the details comprising the invention will be identified by specific names for convenience but they are intended to be as generic in their application as the art will permit.

The invention may be particularly applied to iron oxide, which may be prepared by this method from iron ores such as hematite or magnetite or from by-products such as fine borings, mill scale, or oxides of iron or similar material. Preferably a high grade material, that is, one containing a high proportion of iron, is selected, since less waste will result from the use of such material than in the case where lower grade material is used.

The raw material, if coarse, may first be crushed to the desired size, for example, to pass ½" or ¼" mesh screen. A small amount of fuel, such as fine coal, coke breeze, saw-dust or other solid combustible may then be added if the material itself does not contain a combustible ingredient, and the materials are well mixed together and moistened with water. The moistened mixture is then sintered or blast roasted, the temperature preferably being controlled as by regulating the amount of fuel, the volume of the air blast, the thickness of bed being treated and other factors, so as to produce a relatively fragile sinter cake.

In this sintering operation the original structure of the raw material, whether powder, granular or scale like, is completely destroyed, the particles having been momentarily fused and at the instant of fusion being blown by air currents into a cellular, thin-walled honey-comb structure, full of microscopic pores as well as visible cells.

The chemical nature of the material also is altered. Moisture, oil and other volatile impurities are completely driven off by the heat. Such impurities as sulphur and organic matter are burned out and the iron oxide itself is chemically altered, being transformed largely to ferrite ($Fe_3O_4$) with sometimes small amounts of the higher oxide ($Fe_2O_3$) distributed through the mass with substantial uniformity. Where the raw material is fine iron borings, these are altered largely to ferrite ($Fe_3O_4$) by the operation.

If for any reason any of the original material is not altered, it may be screened out and returned to the succeeding charge. The sintered oxide is then preferably crushed and, if necessary, screened. A type of crushing apparatus which crushes by impact, such as rolls or jaw crushers, rather than one which crushes by grinding action, is preferable, in order that the grains may be formed as sharp, angular fragments, rather than as rounded particles.

The crushed sinter is entirely different from the raw oxide. Crushing does not destroy the cellular, porous structure of the sinter cake, nor does it change its chemical nature. It does, however, convert the irregularly sized broken cakes of sinter into a mass of comparatively fine, sharp, angular, interlocking grains, each one of which has itself a highly porous, microscopically cellular structure. By reason of this structure it is admirably adapted for reaction with a reducing agent, for it presents enormous surfaces to reaction and is freely permeable to penetration of heat. The interlocking angular structure of the grains also tends to hold in place the grains of reducing agent which are mixed with the grains of sinter and hinders any tendency toward segregation of one from the other which might otherwise occur if the package containing the mixture is subjected to jolting or vibration, as in shipment.

The most suitable size to which the sinter should be crushed depends to some extent on the use to which it is to be put. For many purposes it will be found advantageous to crush it to a maximum size somewhat greater than the size of the aluminum (or other metal) grains which are to be mixed with it.

The crushed sinter is then mixed with a finely divided reducing agent, such as metallic aluminum, in a proportion chemically equivalent to the oxygen of the iron oxide. The mixture may then be ignited by any suitable means and the metallic aluminum will act as a reducing agent for reducing iron to the metallic state with the evolution of an intense heat which is capable of melting the metallic iron to form a bath of super-heated metal. The aluminum oxide will then float on the bath as a slag. This molten iron may then be utilized for the welding of iron articles and for other purposes in a manner which is well known in the art.

If the heat developed is in excess to that required to maintain the metal in a molten condition, the yield may be increased by the addition of further quantities of metallic iron which will absorb heat and enter the bath in a molten condition.

As a specific example, iron oxide in the form of mill scale was mixed with 5% of fine anthracite coal and sintered to form a fragile sinter cake, and the cake crushed to pass a $\frac{1}{8}''$ mesh screen. This crushed material was mixed with the chemically equivalent quantity of granular aluminum screened to pass a 14 mesh screen. The mixture made an excellent alumino-thermic product. It ignited readily, reacted with unusual rapidity, developed unexpectedly intense heat and produced an excellent grade of iron.

Another portion of sinter was crushed and screened to pass a $\frac{3}{8}''$ mesh screen and remain on a $\frac{1}{8}''$ mesh screen. This was mixed with the 14 mesh granular aluminum.

The mixture reacted rapidly and with intense heat and produced excellent metal, although the reaction was more difficult to start and it was noted that if subjected to jolting the aluminum grains tended to segregate from the coarse sinter grains.

Another portion of sinter was screened to pass 30 mesh screen and mixed with the 14 mesh granular aluminum. This mixture ignited readily and produced an excellent metal, but in this case the speed of reaction and the temperature developed were less than with the examples given above, although about same as with the alumino-thermic mixtures now on the market.

Preferably, the aluminum used should be in granular form, rather than as fine flakes. The best size of grains will depend on the particular results desired and on the size of sinter grains with which it is to be mixed. As noted above, that screened to pass a screen having 14 meshes per inch has been found satisfactory. The amount used is that amount which is chemically equivalent to the oxygen contained in the sinter grains according to the well-known alumino-thermic reaction.

The rapidity of the reaction is so much greater with the alumino-thermic mixture of this invention as compared to those formerly known and the loss of heat by radiation, absorption in the crucible, etc., is so much less that a surprisingly greater amount of excess heat is developed and consequently a much larger proportion of metallic iron, such as punchings, may be incorporated in the mixture to be melted down and augment the quantity of iron produced from the alumino-thermic iron itself. From 25% to 50% more metallic iron has been added without danger of freezing the "reaction" than is found in some of the alumino-thermic mixtures now in use.

In accordance with the above described process various raw materials may be cheaply converted into an iron oxide in a form which is capable of rapidly reacting with the aluminum to produce super-heated molten metal. The sintering operation not only converts the metal into an open cellular structure which is suited for any future reaction, but also raises the oxygen content of low oxygen bearing iron materials to a comparatively high value. This is an important feature since the heat of reaction is obtained solely from the oxygen which is combined with the iron. The aluminum has a strong reducing action and takes this oxygen from iron oxide with the formation of metallic iron and aluminum oxide.

The product obtained is in an extremely uniform condition, since the various raw materials are completely converted by the sintering operation to a uniform sinter cake. The operation may consequently be carried on with less expensive raw materials than would be the case were their chemical and physical structures not changed to such a marked degree.

The invention has been described with particular reference to iron bearing materials. It will be understood, however, that it is equally applicable to other metals, including chromium, vanadium, etc., whose oxides are capable of reduction by aluminum, calcium and other highly reducing metals.

Although certain novel features of the invention have been shown and described and are pointed out in the annexed claims, it will be understood that various omissions, substitutions and changes in the several steps of the process and in its operation and in the form and details of the apparatus illustrated may be made by those skilled in the art without departing from the spirit of the invention.

What is claimed is:

1. The process of preparing alumino-thermic mixtures which consists in sintering metal oxides capable of reduction by aluminum to produce a sinter cake, crushing the sinter and mixing therewith fine particles of aluminum.

2. The process of preparing alumino-thermic mixtures which consists in sintering iron oxides to a friable sinter cake, crushing the sinter to fine particles, sizing the particles and mixing therewith particles of aluminum in a proportion chemically equivalent to the oxygen of the iron oxide.

3. The process of preparing alumino-thermic mixtures which comprises adding a small quantity of combustible material to iron oxides in finely divided condition, spreading the mixture in a thin layer, sintering said layer while controlling the temperature to form a friable sinter cake, crushing the sinter cake to form comparatively fine particles and mixing said particles with granular aluminum in a proportion equivalent to the oxygen in the sinter.

4. The process of preparing an alumino-thermic mixture which comprises forming an iron bearing material into an iron oxide having open cellular structure and mixing said oxide in a finely divided condition with finely divided particles of aluminum.

5. The process of preparing iron oxide for an alumino-thermic mixture which comprises sintering iron bearing materials to remove impurities and form an iron oxide, and crushing the sinter to form finely divided grains having an open cellular structure.

6. As a product, iron oxide in the form of cellular, porous, angular grains composed primarily of ferrite, mixed with granular aluminum in the proportion chemically equivalent to the oxygen of the oxide.

7. An alumino-thermic mixture comprising iron oxide in the form of finely divided sinter and finely divided aluminum mixed therewith in a proportion chemically equivalent to the oxygen of the iron oxide.

8. An alumino-thermic mixture comprising a metal oxide capable of reduction by aluminum, said oxide being in the form of a finely divided sinter and finely divided aluminum mixed therewith in a proportion chemically equivalent to the oxygen of the metal oxide.

In testimony whereof I have hereunto set my hand.

REED W. HYDE.